April 23, 1963     J. L. LORENZ     3,087,114
FLUID DENSITY SENSITIVE APPARATUS
Filed Dec. 31, 1958
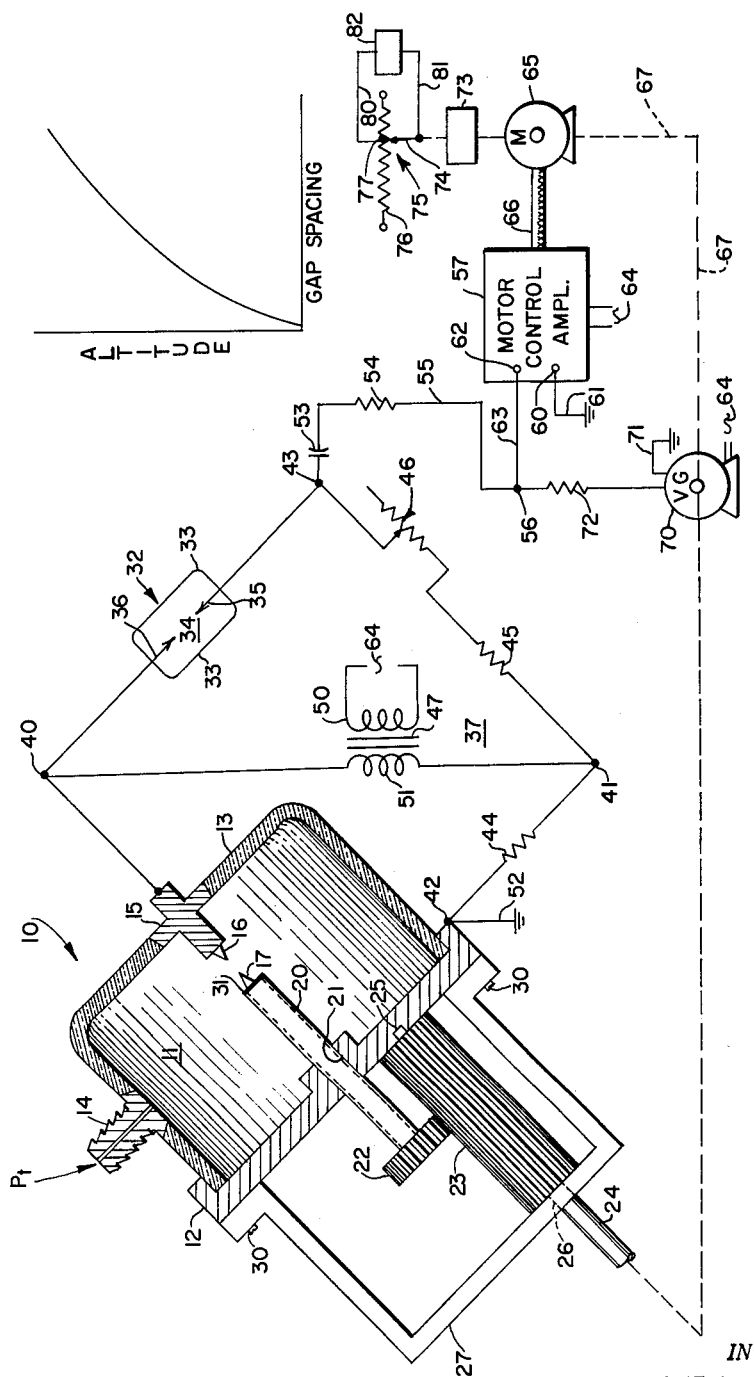
INVENTOR.
JEROME L. LORENZ
BY *George W. Field*
ATTORNEY United States Patent Office 3,087,114
Patented Apr. 23, 1963

3,087,114
FLUID DENSITY SENSITIVE APPARATUS
Jerome L. Lorenz, Minneapolis, Minn., assignor to Minneapolis-Honeywell Regulator Company, Minneapolis, Minn., a corporation of Delaware
Filed Dec. 31, 1958, Ser. No. 784,268
7 Claims. (Cl. 324—71)

This invention relates to the field of fluid density responsive apparatus and more specifically to such apparatus for use in connection with air at low pressure, for example, in altimeters for use at elevations extending above 100,000 feet.

Conventional bellows and diaphragm instruments have heretofore been satisfactory for the subatmospheric pressures encountered in aviation. However, the altitudes reached by ballistic missiles and rockets are such that many feet of change in altitude are required for perceptible response from mechanical altimeters, because the pressure itself is so very low. Alternative altitude responsive arrangements are therefore a necessity, and have been found in apparatus responsive to air density, which is known to be a function of altitude.

It is the principal object of this invention to provide a density responsive instrument using a glow discharge gap of improved design: another object of the invention is to provide an improved glow discharge gap specifically adapted for this use.

These and other objects, advantages and features of novelty not particularly enumerated here which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described the preferred embodiment of my invention.

In the drawing, FIGURE 1 is a schematic showing of apparatus according to the invention, and FIGURE 2 is a diagram illustrating the curve of gap spacing plotted against altitude, for the condition of constant discharge current.

In FIGURE 1 the improved glow discharge gap is indicated by the general reference numeral 10, and is shown diagrammatically to comprise a chamber 11 made up of an electrically conductive base 12 and electrically insulating housing 13 fastened thereto in any suitable, substantially air tight fashion. Chamber 11 is maintained in communication with the gas whose density is to be measured through a nipple 14. An electrically conductive insert 15 is provided in the end of housing 13, and carries internally a discharge electrode 16.

Aligned with electrode 16 is a second, similar electrode 17 carried by a threaded shaft 20 which passes in relatively air tight relation through a threaded hole 21 in base 12. Fixed to shaft 20 externally of chamber 11 is a pinion 22 which engages a broad-faced gear 23 so that the gears may remain in engagement as shaft 20 moves into and out of chamber 11. Gear 23 is mounted on a shaft 24 carried in bearing 25 in base 12 and in a journal 26 in a bracket 27 fastened to base 12 as by screws 30, 30.

Radioactive material is contained within chamber 11 to assist in ionizing the enclosed gas, as will be described below. This material may conveniently be deposited on the end of shaft 20 near electrode 17, as shown by the heavy line 31.

The apparatus of FIGURE 1 also includes a fixed glow discharge gap 32 which comprises a sealed housing 33 enclosing a gas 34 such as air at a predetermined reduced pressure, to comprise a standard or reference density. Fixed electrodes 35 and 36 are shown as arranged to pass through the housing so that a standard or reference glow discharge can take place between them. In devices such as 10 and 32 the discharge is affected both by the electrode spacing and by the gas density. My apparatus includes means for comparing the discharge in gap 10 with that in gap 32, and adjusting the spacing between electrodes 16 and 17 until the two discharges are brought into a predetermined relationship, ordinarily equality.

To this end the gaps are connected in a balancable network 37 having the form of a bridge with input terminals 40 and 41, output terminals 42 and 43, a pair of resistors 44 and 45, a rheostat 46, and an energizing transformer 47 having a primary winding 50 and a high voltage secondary winding 51 connected to terminals 40 and 41. Output terminal 42 is grounded at 52. Output terminal 43 is connected through a blocking capacitor 53, a summing resistor 54, and a conductor 55 to a summation point 56. A motor control amplifier 57 is shown to have a first input terminal 60 grounded at 61, and a second input terminal 62 connected to summation point 56 by a conductor 63. Amplifier 57 is energized from a suitable source 64 of alternating voltage, as is the primary winding of transformer 47, and is shown to energize a motor 65 through a suitable cable 66.

Motor 65 and amplifier 57 cooperate to cause rotation of the motor in one direction or the other according as the signal supplied to amplifier 57 is of one sense or the opposite sense. The shaft 67 of motor 65 drives a rate generator 70 which is energized from source 64 and which supplies an output determined by the speed of rotation of the motor. One output terminal of generator 70 is grounded at 71: the other end is connected to summation point 56 through a resistor 72.

Shaft 67 is extended through a characterizing device 73 to drive a slider 74 of a voltage divider 75 with respect to a winding 76 having a tap 77. The winding is electrically energized from a suitable source, and the voltage appearing between slider 74 and tap 77 is supplied on conductors 80 and 81 to any utilization device 82 such as an indicator or an altitude control apparatus. Characterizing device 73 may be a cam and follower or any suitable arrangement for correcting the rotation of shaft 67 for nonlinearity in the relationship between the signal on summation point 56 and the altitude of the aircraft.

The shaft of motor 67 extending beyond velocity generator 70 is connected to or may itself comprise shaft 24 carrying gear 23. It is thus apparent that operation of motor 65 is effective to increase or decrease the spacing between electrodes 16 and 17, and thus to affect the discharge between these electrodes.

In the operation of the system the pressure in chamber 11 is continuously equalized with that of the ambient atmosphere through nipple 14. The voltage supplied by transformer 47 is selected to maintain a discharge across electrodes 16 and 17, even for sea level atmospheric pressure in chamber 11, with a minimum spacing between electrodes 16 and 17. Radioactive material 31 functions to facilitate initiating the discharge when the system is first energized. It should be pointed out that although network 37 is shown as energized with alternating voltage, direct voltage may also be used: the use of alternating voltage makes power supply somewhat simpler and eliminates the need for a modulator in amplifier 57, and is easily made possible if electrodes 16 and 17 are made physically symmetrical.

If the discharge in gap 10 is not equal to that in gap 32, network 37 is unbalanced and a signal appears between terminals 42 and 43 and is supplied to amplifier 57 through ground connections 52 and 61 and through blocking capacitor 53 and summing resistor 54. Motor 65 operates, changing the electrode spacing and simultaneously positioning slider 74 on winding 76: rheostat 46 is adjusted so that when motor 65 stops slider 74 is at tap 77, for density corresponding to a pressure of one sea level atmosphere. Now as the aircraft rises, the density decreases, the discharge in gap 11 becomes greater, and motor 65 operates to increase the spacing between electrodes 16 and 17.

FIGURE 2 shows the relation between altitude and gap spacing for constant voltage and constant discharge. This curve somewhat departs from a straight line: if a linear characteristic is not needed by device 82, element 73 may be omitted. Rate generator 70 is provided to give anti-hunt properties to the system, and under suitable conditions this may also be omitted. Winding 76 is tapped to take care of the rare occurrence where a density corresponding to altitude below sea level is to be encountered.

Numerous advantages and objects of my invention have been set forth in the foregoing description, together with the details of the structure and function of the invention, and the novel features thereof are pointed out in the appended claims. The disclosure, however, is illustrative only, and I may make changes in detail, especially in matters of shape, size and arrangement of the parts, within the principal of the invention, to the full extent indicated by the broad general meaning of the terms in which the appended claims are expressed.

I claim as my invention:

1. An altimeter comprising, in combination: a chamber communicating with the atmosphere; a pair of electrodes mounted in said chamber; motor means for varying the spacing between said electrodes; means for applying a voltage across said electrodes to maintain therebetween a glow discharge which varies with air density and with electrode spacing; motor control means responsive to variation of said discharge for energizing said motor means to adjust said spacing so as to maintain said discharge at a predetermined value; and output means operated by said motor means.

2. In combination: a variable glow discharge gap including a chamber, means placing said chamber in communication with a gas whose density is to be measured, and a pair of relatively movable electrodes in said chamber; means applying a voltage difference across said electrodes to maintain therebetween a glow discharge having a characteristic which varies with density and with electrode spacing; means responsive to change in said characteristic for causing relative movement between said electrodes so as to maintain said chaarcteristic at a predetermined value; and means responsive to said relative movement.

3. In combination: a balanceable network including a reference glow discharge gap and a variable glow discharge gap; said network being balanced when the discharges of said gaps have a predetermined relationship; motor means actuated upon unbalance of said network to vary said variable gap; and means responsive to the extent of operation of said motor means; said varaible gap including a chamber, means placing said chamber in communication with a gas whose density is to be measured, and a pair of electrodes in said chamber arranged for relative movement by said motor means.

4. In combination: a variable glow-discharge gap including a chamber, means placing said chamber in communication with a gas of which the density is to be measured, a pair of electrodes in said chamber, and means for varying the spacing between said electrodes, the discharge between said electrodes varying with said spacing and with the density of the gas in said chamber; a reference glow discharge gap including a closed chamber and a pair of fixed electrodes in said chamber; a source of voltage for said gaps; means connecting said gaps and said source to comprise a balanceable network which is balanced when the discharges in said gaps have a predetermined relationship; motor means responsive to unbalance of said network for varying said spacing to bring said discharges into said predetermined relationship; and output means operated by said motor means.

5. In combination: a variable glow discharge gap including a chamber, means placing said chamber in communication with a gas of which the density is to be measured, a pair of electrodes in said chamber, and means for varying the spacing between said electrodes, the discharge between said electrodes varying with said spacing and with the density of the gas in said chamber; a reference glow discharge gap including a closed chamber and a pair of fixed electrodes in said chamber; a source of voltage for said gaps; means giving a signal representative of any departure of said discharges from a predetermined relationship; motor means connected to said last-named means and to said variable gap for varying said spacing in accordance with said signal; and output means operated by said motor means.

6. The method of measuring the density of a gas which comprises immersing in the gas a pair of electrodes capable of relative movement, applying a high voltage between said electrodes to maintain a resulting glow discharge therebetween, measuring a characteristic of said resulting discharge which varies with the density of the gas and with the spacing between said electrodes, and causing movement between said electrodes to make said resulting discharge equal to a standard discharge, so that the extent of said movement is a measure of said density.

7. The method of measuring low gas pressure which comprises subjecting to the low pressure a pair of electrodes capable of relative movement, applying a high voltage between said electrodes to maintain a resulting glow discharge therebetween, measuring a characteristic of said resulting discharge which varies with the density of the gas and with the spacing between said electrodes, and causing movement between said electrodes to make said resulting discharge equal to a standard discharge, so that the extent of said movement is a measure of said pressure.

References Cited in the file of this patent

UNITED STATES PATENTS

| | | |
|---|---|---|
| 1,140,816 | Harlan | May 25, 1915 |
| 1,377,282 | Schafer | May 10, 1921 |
| 1,816,178 | Darnall | July 28, 1931 |
| 2,640,870 | Seitz | June 2, 1953 |
| 2,739,478 | Offner | Mar. 27, 1956 |
| 2,761,976 | Obermaier et al. | Sept. 4, 1956 |
| 2,854,625 | Dudley et al. | Sept. 30, 1958 |